C. C. THOMAS.
METHOD OF AND APPARATUS FOR DETERMINING RATE OF FLOW OF STEAM AND OTHER GASES AND VAPORS.
APPLICATION FILED DEC. 30, 1908.
946,886.
Patented Jan. 18, 1910.
2 SHEETS—SHEET 1.
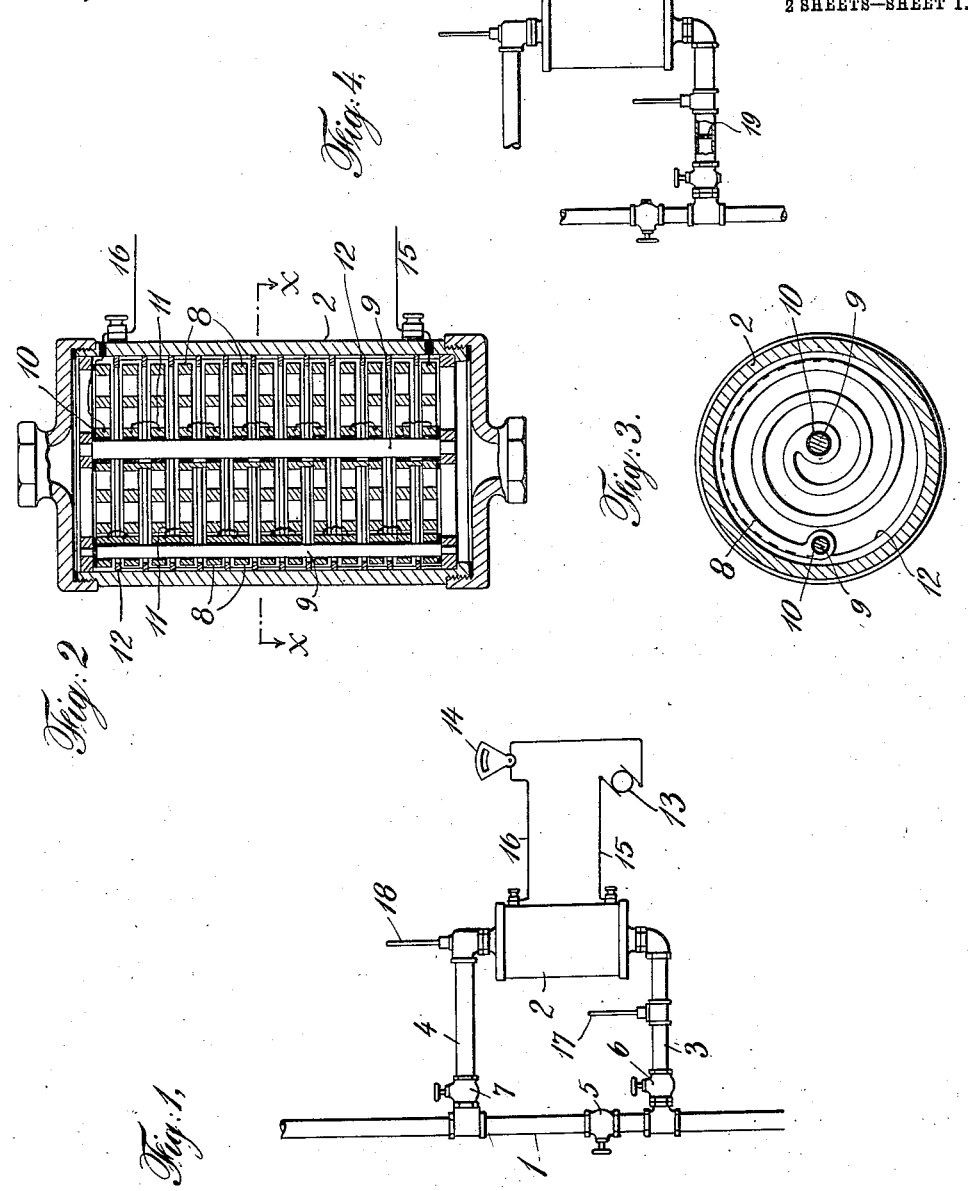

C. C. THOMAS.
METHOD OF AND APPARATUS FOR DETERMINING RATE OF FLOW OF STEAM AND OTHER GASES AND VAPORS.
APPLICATION FILED DEC. 30, 1908.
946,886.
Patented Jan. 18, 1910.
2 SHEETS—SHEET 2.
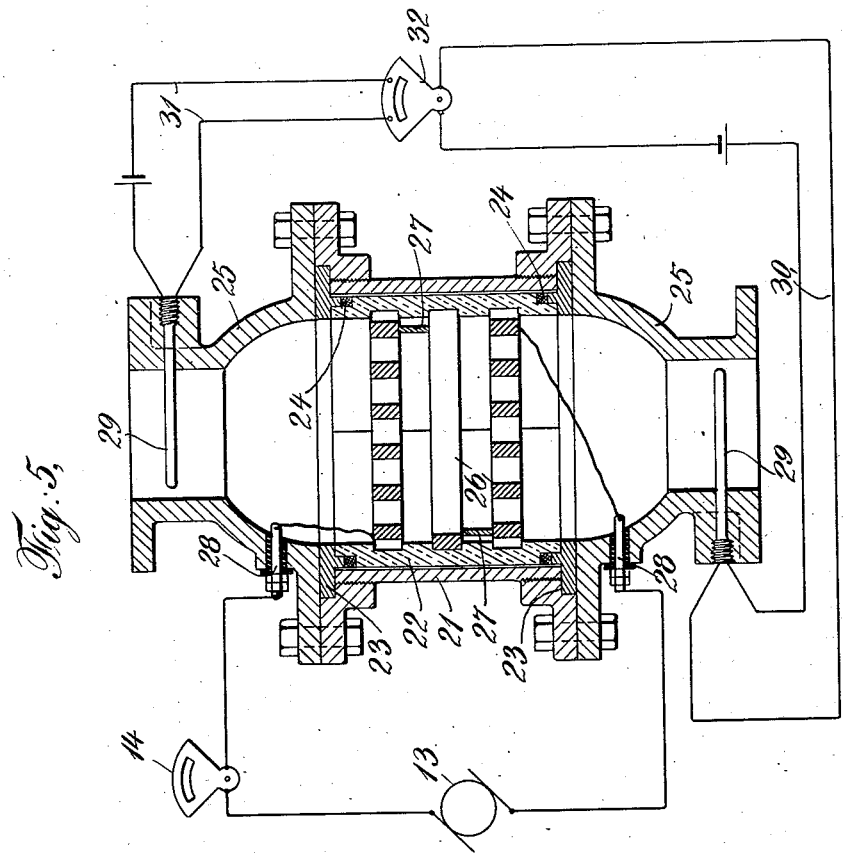
WITNESSES
Max B. A. Doring
Frank E. Raffman
INVENTOR
C. C. Thomas
BY
ATTORNEYS

UNITED STATES PATENT OFFICE.

CARL C. THOMAS, OF MADISON, WISCONSIN.

METHOD OF AND APPARATUS FOR DETERMINING RATE OF FLOW OF STEAM AND OTHER GASES AND VAPORS.

946,886.  Specification of Letters Patent.  Patented Jan. 18, 1910.

Application filed December 30, 1908. Serial No. 470,006.

*To all whom it may concern:*

Be it known that I, CARL C. THOMAS, a citizen of the United States of America, and a resident of Madison, county of Dane, State of Wisconsin, have invented a Method of and Apparatus for Determining Rate of Flow of Steam and other Gases and Vapors, of which the following is a specification.

My invention relates to a method of and apparatus for determining the quantity of steam or other gas or vapor flowing through a pipe or other conduit in a given time, and is based upon the principle that, if the specific heat of the gas the flow of which is to be measured be known, as it is in the case of superheated steam and most other gases, determination of the rise of temperature produced by imparting to such gas a known amount of heat permits the determination of the quantity of gas to which that heat is imparted, by a very simple calculation; and in practice, with no calculation at all, reference being made instead to calibration curves or tables obtained by experiment or calculation.

As an apparatus my invention comprises a chamber through which the steam or other gas may pass, said chamber having within it heating means, usually electric resistance conductors, by which heat may be imparted to the steam or other gas, measurement of the amount of heat so imparted being effected, in the case of electric heating, by measurement of the amount of energy passed through such coils in a given time. In connection with this chamber I provide means for measuring the temperature of the steam or other gas used, before said steam or gas is subjected to the heating action, and after it has been subjected to such heating action.

The objects of my invention are, to improve present methods of determining the amount of steam or other gas flowing through pipes or conduits, and to provide a simple accurate and easily operated apparatus for measuring quantities of steam or other gas.

In the accompanying drawings I have illustrated more or less diagrammatically two forms of apparatus embodying my said invention and adapted for carrying out the method comprised in my invention.

In said drawings: Figure 1 shows an elevation of one form of the apparatus as arranged for use; Fig. 2 shows a central vertical section of the heating chamber; Fig. 3 shows a transverse section of such chamber on the line *x—x* of Fig. 2; Fig. 4 is a diagrammatic view illustrating the connection of the apparatus in shunt; Fig. 5 shows a central vertical section of an alternative form of the apparatus; and Fig. 6 shows a top view of one of the resistance grids used in this form of apparatus.

Referring to Figs. 1–4 inclusive, 1 designates a pipe through which steam or other gas to be measured may flow, and 2 designates the said heating chamber of a measuring apparatus, said chamber being in this instance shown connected in shunt to the pipe 1 by means of a supply pipe 3 and a return pipe 4, suitable valves 5, 6 and 7 being provided, so that the steam or other gas may be passed through chamber 2 or not, at will. For imparting heat to the steam or other gas passing through chamber 2, I may employ any suitable heating means capable of imparting to said gas passing through the chamber an accurately measurable quantity of heat, but preferably I employ electric resistance conductors for this purpose; and while I may employ any suitable arrangement of electric resistance conductors, I preferably employ a series of metallic grids, somewhat similar to the cast iron grids commonly used in connection with electric motor controllers and the like. In Figs. 2 and 3, 8, 8 designate these grids and 9, 9 designate rods upon which these grids are mounted and by means of which they are secured together so as to form a single structure. As indicated particularly in Fig. 3, these grids are preferably of spiral form, although I do not limit myself to the use of this particular form of grid. In general these grids will be connected in series and therefore I have shown on rods 9 insulating bushings 10, which may be of mica or other suitable material adapted to withstand the temperatures to which the contents of the chamber 2 will be subjected. As shown particularly in Fig. 2, adjacent grids are in contact with each other at their centers and at their outer ends, alternately; and the simple contact of the grids may be relied upon to establish electric connection between them, though preferably I provide bonding conductors 11. Between adjacent grids I provide flanges or rings 12 projecting from the inner wall of chamber 2 inwardly, for the purpose of preventing water or other liquid, which may be carried with the steam or gas, from working its way along the inside of the chamber 2 so as not to come in contact with the grids 8.

In Fig. 1 I have indicated an electric generator 13 for supplying current to the electrical resistance conductors, and a wattmeter 14 for measuring the quantity of currents supplied to the resistance conductors; 15 and 16 designating the electric terminals of the apparatus. For measuring the temperature of the steam or other gas before and after passing through the chamber 2, I may employ any suitable temperature-measuring device, but have indicated for the purpose ordinary steam thermometers 17 and 18. Using this apparatus, the quantity of steam or other gas passing through the apparatus per unit of time, may be obtained from the equation $$W = \frac{Q}{KC_p (T_1 - T_2)}$$

wherein $Q$ = heat supplied electrically per unit of time; $W$ = weight of steam in pounds per unit of time; $C_p$ = specific heat of steam; $K$ = experimentally determined coefficient allowing for heat losses; $T_1 - T_2$ = temperature range, i. e., difference between temperatures as shown by thermometers 18 and 17 respectively. In this case the steam is assumed to be superheated or at least dry-saturated. If not dry-saturated or superheated, considerable electric energy is introduced to dry the steam and superheat it to a given temperature, which temperature is used as the temperature $T_2$ in the above equation, and then enough more energy is added to superheat the steam some further amount, the temperature thus obtained being used as the temperature $T_1$ in the above equation, and then the calculation of weight of steam can be obtained by the same equation above given, $Q$ in the equation being then the additional amount of energy required to raise the temperature of the steam the predetermined amount above the first temperature of superheat, i. e., being the difference between the electrical energy, required to obtain temperature $T_1$, (the higher degree of superheat), and the electrical energy required to obtain temperature $T_2$, (the lower degree of superheat), reduced to equivalent heat units. The measurement of the quantity of gas flowing through the apparatus in the case of gases other than steam, is determined in the same way, the specific heat of the gas mixture being known.

In practice it will be unnecessary to solve the equation, calibration curves or tables being employed instead, it being necessary merely to measure the amount of electrical energy required to raise the temperature of the gas a certain known amount and then to learn the quantity of gas by reference to the calibration curve or table, which curve or table is based on experiments with the meter.

If desired, only a small proportion of the total amount of steam flowing through pipe 1 may be passed through the apparatus, the pipe 3 in such case being of restricted diameter as compared with pipe 1, or, and preferably, having in it an orificed partition 19 (Fig. 4) the orifice of which is of known area. In such case the flow of steam through the main line 1 and through the shunt 3 and orifice in partition 19 will be in inverse proportion to the respective resistances offered to the passage of the steam through pipe 1 and orificed partition 19, respectively, and the ratio of these resistances is easily determined; and once known, by measurement of the steam flowing through the by-pass or shunt, it is easy to determine the amount of steam flowing through the main pipe 1 and so to determine the total amount of steam flowing.

In practice the amount of steam shunted through the meter is proportional to the total steam flowing through the main pipe and the meter combined, and the energy required to raise the temperature of the steam going through the meter therefore gives a measure of the total steam flowing.

It is desirable in many cases to have the steam meter a permanent part of the steam piping system, and it is also desirable, in many cases, to be able to read, at a distant point, the amount of steam passing through the instrument at any given time. For this latter purpose it is convenient to use electrical resistance thermometers or equivalent electric temperature-measuring means, such for example as thermo-junctions; these electric temperature-measuring means being included in electric circuits which may lead to an electric measuring instrument at any convenient point—even a point quite distant from the steam meter.

In Fig. 5 I illustrate a form of steam meter, particularly adapted by its construction, to be made a permanent part of the steam piping, and fitted with electric resistance thermometers, such as referred to. This apparatus comprises a casing 21 within which is a suitable lining 22, preferably of porcelain or like insulating material, and preferably formed in two or more parts, for convenience in placing within it the hereinafter mentioned grids. This lining is held within the casing by means of gland rings 23, suitable packing material 24 being provided to make tight joints. The glands themselves are held in place by means of the bonnets 25 secured to the casing 21.

26, 26 designate the grids, shown in detail in Fig. 6. These grids, as indicated particularly in Fig. 6, are of return bend form, comprising longitudinal bars connected at the ends, and these longitudinal bars of adjacent grids are arranged transversely with respect to one another, as indicated particularly in Fig. 5, in order that the steam may be efficiently baffled and brought into good heating contact with the surfaces of the grids. These grids are mounted in grooves in the insulation lining 22 of the instrument and are connected electrically in series by conducting blocks 27 inserted for that purpose. The bonnets 25 have suitable electric terminals 28 connected to the lowermost and uppermost grids; these terminals being connected to an electrical generator 13 and electrical current measuring instrument 14 as in Fig. 1. The apparatus is provided with electrical temperature measuring means, for example, so-called electric resistance thermometers, 29, carried by the bonnets 25 and located directly in the path of steam or other gas flowing into and out of the instrument, and connected by electric circuits 30 and 31 respectively, to an inserument 32 for measuring the difference between the temperatures to which the two electrical thermometers 29 are subjected. Electrical resistance thermometers, such as the devices 29 indicated, are resistance devices the resistance of which varies with the temperatures to which they are subjected.

I have not indicated any special construction of electrical resistance thermometers or other electrical temperature measuring device, as such devices are well known; nor have I indicated any particular construction of electrical instrument 32 for indicating the difference between the temperatures to which said thermometers are subjected, as such instruments are well known.

It will be observed that the indicating instruments 14 and 32 may be located at a considerable distance from the steam meter, for example, may be located on the switch board, gage stand or in an office of the plant at which the steam meter is located, so making it very convenient for a switch board attendant, chief engineer, superintendent or other officer to keep track of the steam consumption of the plant or a portion thereof.

What I claim is:—

1. The method of determining rates of flow of dry steam and other gases, which comprises determining the rise of temperature produced by imparting to a moving current of the gas within a unit of time a known amount of heat.

2. The method of determining rates of flow of dry steam and other gases, which comprises passing a moving current of such gas into heating proximity to electric resistance means, passing current through such resistance means and thereby heating the gas, and determining the rise in temperature produced by the passage of a known amount of current within a unit of time.

3. The method of determining the rate of flow of wet steam and like vapors, which comprises adding sufficient heat to a moving current of such vapor to dry and superheat it and also adding in addition a further known amount of heat and determining the rise in temperature produced, within a unit of time, by the addition of such further amount of heat.

4. The method of determining the rate of flow of wet steam and like vapors, which comprises passing a moving current of such vapor in heating proximity to electrical resistance means, passing through such resistance means electric current sufficient to generate enough heat to superheat the vapor and so convert it into gas, and also passing through such resistance means a further known amount of current and determining the rise of temperature produced in the gas, during a unit of time, by the passing of such additional amount of current.

5. In a method of determining rates of flow of dry steam and other gases, the step which consists in imparting heat at a known rate to a moving current of dry gas, and at a rate sufficient to produce a material rise of temperature in such gas, and determining the rise of temperature in such gas thereby produced.

6. In a method of determining rates of flow of dry steam and other gases, the step which consists in passing a moving current of such dry gas into heating proximity to electric resistance means, passing a known current, sufficient to cause a material rise in temperature of such gas, through such resistance means, and determining the rise in temperature produced in the gas by the passage of the current at such rate.

7. In a method of determining the rate of flow of wet steam and like vapors, the step which consists in adding to such vapor heat sufficient to dry and superheat such steam or vapor, and also adding in addition further heat at a known rate, and at a rate sufficient to cause a material rise of temperature in the gas produced by so superheating such steam or vapor, and determining the rise in temperature produced in the moving current of gas by such additional heat.

8. In a method of determining rates of flow of wet steam and like vapors, the step which consists in passing a moving current of such vapor in heating proximity to electric resistance means, passing through such resistance means electric current sufficient to generate enough heat to superheat the vapor and so convert it into a gas, and also passing through such resistance means a further known current, sufficient to cause a material rise in temperature of said gas, and determining the rise of temperature produced in the gas by the passage of such additional current.

9. The method of determining rates of flow of dry steam and other gases, which consists in adding heat at a known rate to a moving current of the dry gas, and at a rate sufficient to cause a material rise in temperature of such gas, determining the rise of temperature produced in such gas thereby, and from the known specific heat of the gas and the known rate at which heat is imparted to such gas, determining the quantity of the gas flowing within a given unit of time.

10. The method of determining rates of flow of dry steam and other gases, which consists in passing a moving current of such dry gas into heating proximity to electrical resistance means, passing a known current, sufficient to cause material rise in temperature of such gas, through such resistance means, determining the rise in temperature produced in the gas by the passage of the current, and from the known specific heat of the gas and the observed rise in temperature produced by the passage of the current, determining the amount of gas flowing during a given unit of time.

11. The method of determining the rate of flow of wet steam and like vapors, which consists in adding to a moving current of such vapor, heat sufficient to dry and superheat it, and also adding in addition a further amount of heat at a known rate and determining the rise in temperature produced, within a unit of time, by the addition of such further heat, and from the known specific heat of the dry gas, and the observed rise in temperature produced in such gas by the addition of such additional amount of heat thereto, determining the quantity of steam or vapor flowing in a given unit of time.

12. The method of determining the rate of flow of wet steam and like vapor, which consists in passing a moving current of such vapor in heating proximity to electrical resistance means, passing through such resistance means electric current sufficient to generate enough heat to superheat the vapor and so convert it into a gas, and also passing through such resistance means a further known current sufficient to cause a material rise in temperature of said gas and determining the rise of temperature produced in the gas by the passing of such additional amount of current, and from the known specific heat of the dry gas, and the observed rise of temperature produced by the passage of such additional amount of current, determining the amount of steam or vapor flowing in a given unit of time.

13. Apparatus such as described, comprising a chamber adapted to permit the flow of steam or other gas or vapor through it, heating means within such chamber in the path of the gas or vapor flowing therethrough, means for determining the amount of heat so imparted to such gas or vapor, comprising an instrument adapted for location at a distance from said chamber and means connecting it operatively with the heating means of said chamber, and means for determining the difference between the temperatures of the gas or vapor, before and after the passage of such gas or vapor in heating proximity to such heating means, comprising temperature-measuring means including temperature-affected operating means located within the range of influence of the gas or vapor and an indicating instrument therefor, adapted for location at a distance from said chamber and means operatively connecting such instrument to said operating means.

14. Apparatus such as described, comprising a chamber adapted to permit the flow of steam or other gas or vapor through it, heating means within such chamber in the path of the gas or vapor flowing therethrough, means for measuring the amount of heat so imparted to such gas or vapor, and means for determining the difference of temperatures of the gas or vapor before and after passage in proximity to such heating means, comprising electrical thermometers and indicating means therefor, electrically connected therewith.

In testimony whereof I have signed this specification in the presence of two subscribing witnesses.

CARL C. THOMAS.

Witnesses:
R. H. PINNEY,
G. ROSCOE THOMAS.